United States Patent [19]
Radek

[11] 3,861,533
[45] Jan. 21, 1975

[54] BICYCLE RACK
[75] Inventor: John R. Radek, Hinsdale, Ill.
[73] Assignee: Ready Metal Manufacturing Co., Chicago, Ill.
[22] Filed: May 16, 1973
[21] Appl. No.: 360,823

[52] U.S. Cl. .................................................. 211/20
[51] Int. Cl. ............................................. A47f 7/00
[58] Field of Search ............... 211/5, 17, 18, 19, 20, 211/21, 22, 23, 24; 70/233, 234, 235

[56] References Cited
UNITED STATES PATENTS

| 591,078 | 10/1897 | Jewell et al. | 211/19 |
| 602,415 | 4/1898 | Moore | 211/19 |
| 605,628 | 6/1898 | Bradley | 211/19 X |
| 623,245 | 4/1899 | Hamilton | 211/20 |
| 636,629 | 11/1899 | Butcher | 211/19 X |
| 639,991 | 12/1899 | Jewell | 211/19 |

FOREIGN PATENTS OR APPLICATIONS

| 44,214 | 10/1930 | Denmark | 211/19 |
| 463,497 | 4/1937 | Great Britain | 211/20 |
| 399,941 | 10/1933 | Great Britain | 211/20 |
| 216,901 | 8/1961 | Austria | 211/20 |
| 82,550 | 3/1956 | Netherlands | 211/22 |

Primary Examiner—Roy D. Frazier
Assistant Examiner—Thomas J. Holko
Attorney, Agent, or Firm—Frank H. Marks

[57] ABSTRACT

A bicycle rack specially designed to display bicycles to optimum advantage in a retail store. Constructed preferably of wire for lightweight, convenient portability, knock-down for efficient packaging, and consisting essentially of a base with terminal bumper and rocking cradle and detachable retainer for supporting a bicycle in upright position for maximum visual exposure.

6 Claims, 13 Drawing Figures

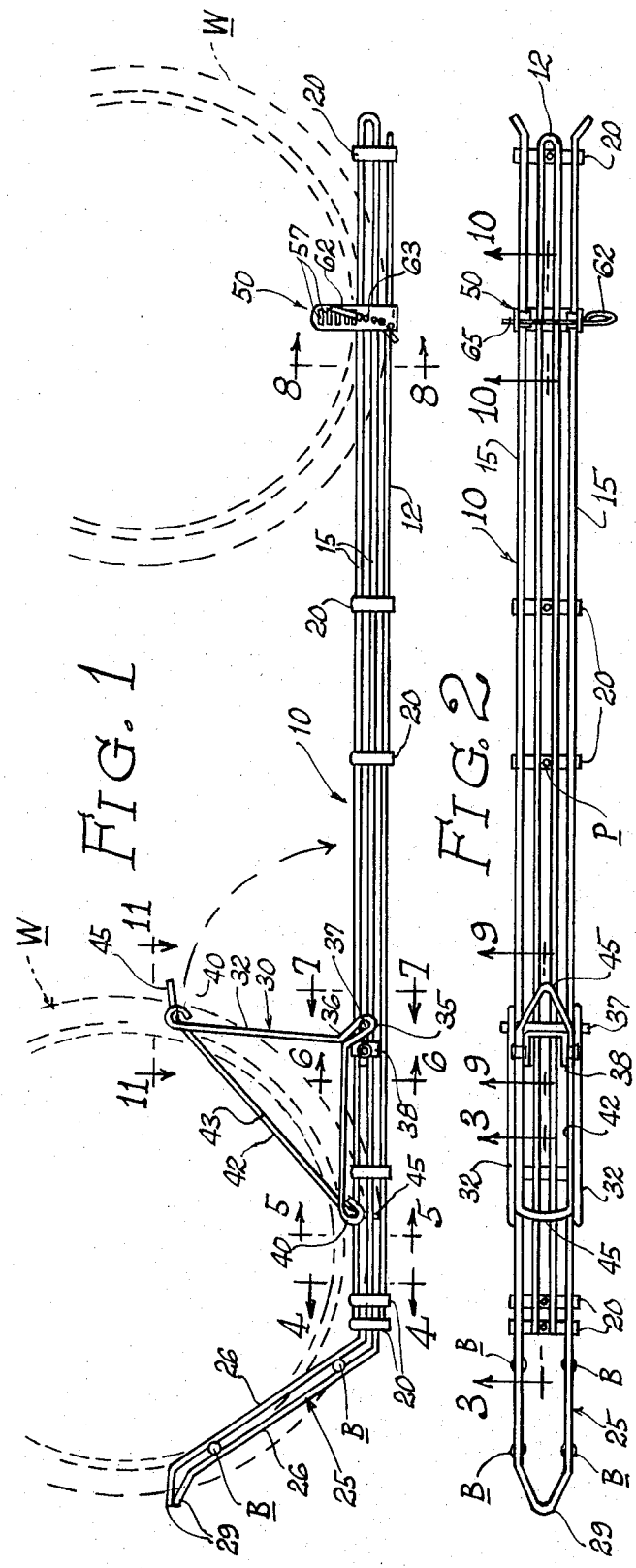

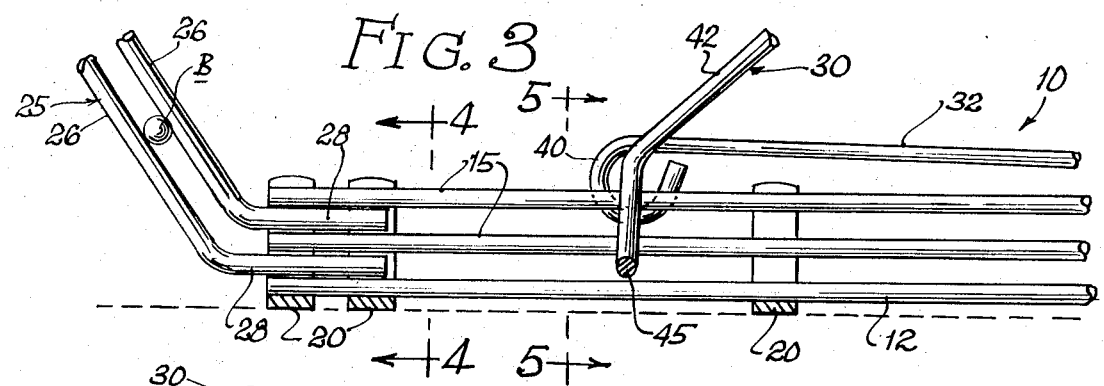
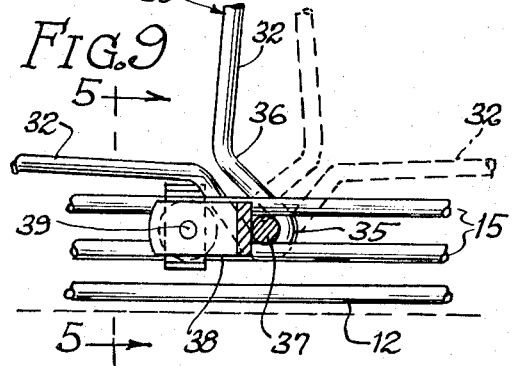
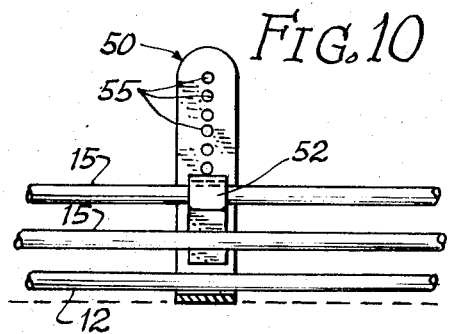
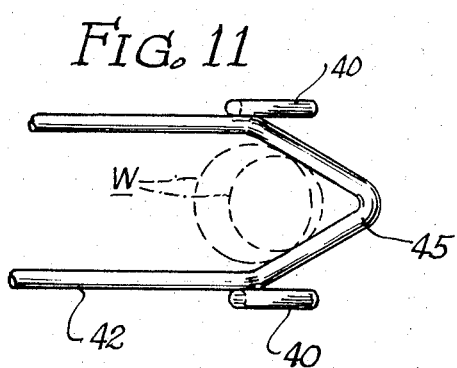
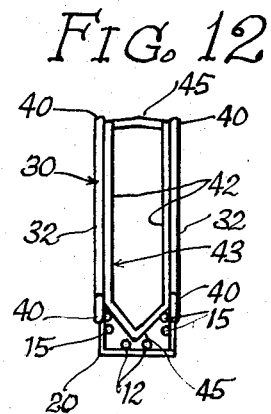
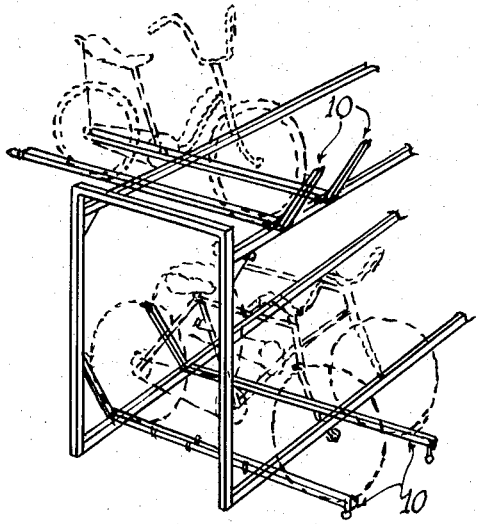

BICYCLE RACK

My invention relates generally to portable supports for small wheeled vehicles and has to do more particularly with bicycle racks.

My invention is primarily concerned with providing a bicycle rack designed to display practically an entire vehicle for visual inspection while effectively supporting it in normal erect position. Thus, racks embodying my invention are especially suitable for displaying a plurality of bicycles in a retail store for optimum viewing by prospective purchasers, although they may be used elsewhere.

BACKGROUND OF THE INVENTION

Bicycle racks have long been known for supporting a plurality of such vehicles at places where they may be left while the owner is engaged nearby. Such racks have served mainly as an alternative to leaving a number of bicycles in a jumbled heap where they might be damaged by contact with each other and be difficult to identify and remove. In such previously known racks the objective of displaying the bicycle to best advantage for sales purposes has been given little or no consideration.

BRIEF OUTLINE OF INVENTION

A particular advantage of my invention is to provide a bicycle rack that will support any desired number of bicycles for optimum display, giving adequate support with minimum contact, obviating the likelihood of marring in the course of inserting and removing a vehicle from the rack.

A further object is to provide such a rack wherein a bicycle may be inserted and removed with a minimum of effort and with a minimum of contact between a bicycle and the rack and no contact with adjacent bicycles.

Still another object is to provide such a device that is rugged and inexpensive, may be fabricated by mass production methods of relatively inexpensive, lightweight material, preferably wire, and may be shipped in knockdown condition, thus being especially suitable for mass distribution to chain stores and other retailers.

Various other objects and advantages will suggest themselves to those skilled in the art as the description proceeds.

BRIEF DESCRIPTION OF THE DRAWINGS

Referring now to the drawings illustrating a preferred embodiment of my invention, FIG. 1 is a side elevational view of a bicycle rack embodying my invention, with phantom showing of wheels of a bicycle disposed therein;

FIG. 2 is a top plan view of the same;

FIG. 3 is a fragmentary sectional view on an enlarged scale taken substantially along line 3—3 of FIG. 2;

FIG. 4 is an enlarged section taken substantially along line 4—4 of FIGS. 1 and 3;

FIG. 5 is a similar sectional view taken along line 5—5 of FIGS. 1 and 3;

FIG. 6 is a section along line 6—6 of FIG. 1;

FIG. 7 is a section along line 7—7 of FIG. 1;

FIG. 8 is a section along line 8—8 of FIG. 1;

FIG. 9 is a fragmentary elevational detail showing attachment of a wheel cradle forming a feature of my invention;

FIG. 10 is a fragmentary elevational detail showing a securing device forming a feature of my invention, as seen from a position along line 10—10 of FIG. 2;

FIG. 11 is a fragmentary plan view of an end portion of the cradle, as seen from a position along line 11—11 of FIG. 1, and FIG. 12 is a reduced section on line 5—5 of FIG. 1, and FIG. 13 is a perspective view on reduced scale of an assembly of a plurality of such racks mounted in a suitable frame, as in a retail store.

DETAILED DESCRIPTION

The preferred embodiment of my invention disclosed here comprises a main elongated tray-like support indicated generally by numeral 10, having a base portion 12 and side portions 15, 15. Said base and side portions are preferably formed of bent wire of suitable gauge to provide the needed strength and rigidity and may be nickel coated or otherwise attractively finished.

The wires are disposed in substantial parallelism extending longitudinally of the support, being retained in fixed relation by a series of longitudinally spaced U-shaped straps of stirrups 20 spot welded to the adjacent wires. Said straps 20 (FIG. 2) may be perforated as at P to permit passage of a screw detachably securing the wire support to a suitable frame (FIG. 12), as hereinafter described.

Bent upwardly at an obtuse angle at the forward end of the support is a bumper 25 (FIGS. 1-3). Said bumper may be formed of a pair of wires 26, 26 similar to the material of the tray portion of the support and having terminal legs 28 spot welded to straps 20 (FIG. 3), each wire having a bight portion 29 at its forward extremity, the two bight portions (FIG. 1) being disposed close or adjacent to each other. The wires 26, 26, duplicated for added strength, are secured together to provide a rigid unit as by metal balls B welded to them at spaced points therebetween.

A cradle 30 rockable in a vertical plane is mounted adjacent the forward end of the support, serving to retain a bicycle in erect position. Said cradle comprises a plurality of parallel, horizontally spaced wires arranged in triangular formation (FIG. 1).

Thus, the cradle comprises a pair of similar parallel wires 32, 32 (FIGS. 1, 7) each bent to form a right angle with a bight portion 35 pivotally carried on suitable bearing means 37, the latter being longitudinally adjustable on support 10 by being welded or brazed to a U-bar 38 slidably secured to the support as by screws 39 (FIGS. 6, 7). Bight 35 may be pinched as at 36 (FIG. 9) to permit springing into and out of engagement with bearing 37 for quick attachment or detachment.

Wires 32 terminate in loops 40 welded or brazed to a wheel-embracing elongated frame formed of a continuous wire 42 joined as at 43, each side of which frame is a hypotenuse to one of the triangles formed by wires 32, 32. The ends of frame 42 are substantially V-shaped (FIGS. 5, 11) to seat snugly tires of various sizes, as indicated at 45.

It will be understood that, when a bicycle is to be disposed in the rack, either front or rear wheel W may be rolled onto the support and into the cradle, being gripped by the V-rests of frame 42. Further horizontal movement of the bicycle rocks the cradle on its axis 37 through an arc of 90 degrees, whereupon the wheel and cradle take positions as seen in FIG. 1, the wheel being firmly seated between bumper 25 and arm 42. The bicycle is thus firmly supported in upright position and fully exposed to view.

Removal of the bicycle rocks the cradle reversely, permitting ready withdrawal from the rack.

When a bicycle is set up in the rack, it is desirable that it not be casually removed by an unauthorized person. Hence, I provide an improved bicycle securing device as a feature of my invention.

Referring to FIGS. 1, 8 and 10, I provide a U-bar 50 slidable longitudinally along support 10 and having integral hook portions 52, 52 (FIG. 8) for preventing vertical displacement of bar 50 with reference to side wires 15 with which said hooks are slidably engageable.

One leg of said bar 50 is provided with spaced circular perforations 55 while the other leg has spaced horizontally elongated slots 57.

A securing member 60 having a handle portion 62 is secured to U-bar 50 as by a chain 63 and has a pin portion 65 with a deformation or boss 67 bent therein adjacent handle 62.

It will be seen that, when a bicycle has been placed in the rack, the U-bar may be slid under a wheel W thereof and secured against removal by inserting pin 65 through one of the slots 57 and a perforation 55 and then rotated, moving boss 67 to downward position as seen in FIG. 8. The bicycle is thus secured against removal from the rack until pin 60 is removed.

Thus, it will be apparent that I have provided an extremely convenient and economical bicycle rack having many important advantages. It should be noted that maximum production efficiency is accomplished by forming each side and also the bottom of support 10 of a single wire bent at one end to provide a double length.

Various changes coming within the spirit of my invention may suggest themselves to those skilled in the art. Hence, I do not wish to be limited to the specific form or forms shown or uses mentioned herein, except to the extent indicated in the appended claims.

I claim:

1. A bicycle rack comprising
   a. a substantially horizontal elongated support having a base portion and upstanding side portions adapted to support both wheels of a bicycle,
   b. a wheel stopping bumper portion on one end of said support,
   c. a rockable cradle pivotally mounted on said base portion between said side portions in proximity to said bumper portion and comprised of a pair of arms extending angularly from a pivotal junction,
   d. guide means in the form of a substantially closed elongated loop affixed to said arms remote from said pivotal junction for engaging the rim of said last-mentioned wheel, said guide means being secured to said arms at a predetermined distance from said pivotal junction, and
   e. a pivot pin mounted in and extending between said side portions for sliding movement longitudinally of the support for accommodating said pivotal junction, so that the rolling of said last-mentioned wheel into said rockable cradle, with one of said arms in juxtaposition to said base portion, against the other arm, effects a rocking of said cradle to bring the latter arm into juxtaposition with the base portion, permitting the forward part of said last-mentioned wheel to engage said bumper portion.

2. A device as set forth in claim 1, wherein said bumper portion, rockable cradle and guide means are formed essentially of tenuous material.

3. A device as set forth in claim 2, wherein the arms of the rockable cradle are constituted by a pair of integral lengths of wire, each bent into the general contour of a right-angled triangle with arms at a displacement from each other in parallel planes corresponding substantially to the upstanding side portions of said base portion, with said guide means formed as a closed loop of wire having tapered ends constituting wheel seats secured to said integral lengths of wire as a hypotenuse of said right-angled triangles.

4. A device as set forth in claim 1, including a wheel securing member secured to said support remotely from the bumper portion, and means for adjustably mounting said member for engagement with the rim of the other wheel of said bicycle.

5. A device as set forth in claim 4, wherein
   a. said securing member is a U-shaped element having upwardly extending legs and a bridge portion,
   b. means preventing upward displacement of said member on said support, and
   c. a securing element detachably bridging said legs to prevent displacement of said other wheel.

6. A rack as in claim 1, wherein the arms are integral, having a bight formed at their vertex defining a journal for the pivot pin.

* * * * *